United States Patent [19]

Sullivan et al.

[11] Patent Number: 5,528,707
[45] Date of Patent: Jun. 18, 1996

[54] BIDIRECTIONAL OPTICAL MODULATOR HAVING LIGHTWAVE SIGNAL CONSERVATION

[75] Inventors: Charles T. Sullivan, Albuquerque, N.M.; Mark P. Bendett, Ann Arbor, Mich.

[73] Assignee: Honeywell Inc., Minneapolis, Minn.

[21] Appl. No.: 315,511

[22] Filed: Sep. 30, 1994

[51] Int. Cl.$^6$ ............................................. G02F 1/17
[52] U.S. Cl. ............... 385/2; 359/245; 359/315; 385/8; 385/15
[58] Field of Search .................... 385/1–10, 12, 385/13, 15, 16; 359/237–240, 245, 249, 254, 298, 315, 320

[56] References Cited

U.S. PATENT DOCUMENTS

| | | | |
|---|---|---|---|
| 4,293,188 | 10/1981 | McMahon | 385/13 |
| 4,359,261 | 11/1982 | Levi | 385/16 |
| 5,105,248 | 4/1992 | Burke et al. | 385/8 XR |
| 5,105,301 | 4/1992 | Campi | 359/245 |
| 5,155,617 | 10/1992 | Solgaard et al. | 359/245 |

*Primary Examiner*—John D. Lee
*Attorney, Agent, or Firm*—John G. Shudy, Jr.

[57] ABSTRACT

A modulating optical element having ports wherein either port can output or receive light signals. An electrooptic effect is applied to the optical element to allow the light signals to pass or not pass through the optical element. Due to the electrooptic effect in preventing signals from passing through the optic element, light signals radiate out of the optical element and are absorbed by the substrate of the optical element assembly. Rather than being lost, the energy from the light signal is converted to current which may be used for other purposes in the modulator system, such as bias stabilization.

25 Claims, 10 Drawing Sheets

| | | |
|---|---|---|
| 13 UPPER CLAD | 1.0μm | $Al_y Ga_{1-y} As$ |
| 12 CORE | 1.0μm | $Al_x Ga_{1-x} As$ |
| 11 LOWER CLAD | 3.0μm | $Al_y Ga_{1-y} As$ |
| 6 SUBSTRATE | | GaAs, SEMI-UNSULATING |

$y - x = 0.05$
$y \approx 0.30$
UNDOPED $\lambda = 840$nm

BIDIRECTIONAL OPTICAL MODULATOR HAVING LIGHTWAVE SIGNAL CONSERVATION

BACKGROUND OF THE INVENTION

The invention pertains to optical devices for lightwave communications. Particularly, the invention pertains to electro-optic modulators on absorptive substrates and, more particularly, pertains to such modulators having multifunctionality, particularly lightwave modulation and photodetection.

Any electro-optic modulator incorporating optical waveguides is well known in the art. In lightwave communications, light is modulated with electric signals and is transmitted to a receiver along some desired path, usually on an optical fiber. This constitutes a lightwave link whose function is to communicate the electric signals at the transmitter to electric signals at the receiver. The receivers and transmitters are two separate components of the lightwave link in the art. Lightwave transmitters are usually classified as directly modulating transmitters or as indirectly modulating transmitters. Directly modulating transmitters are typically semiconductor laser transducers which convert the impressed electric signal directly into lightwave signals. Indirectly modulating transmitters consist of three devices: a laser which converts electric energy into lightwave energy, a path to conduct the lightwave energy from the laser to the modulator, and a modulator which converts electric signals into lightwave signals. In this case, the laser is a transducer optimized to generate light but not modulate light, and the modulator is a transducer optimized to modulate light but not generate light. This permits independent control and optimization of the light generation function and of the light modulation function. It is well known in the art that compromises in link performance, reliability, and lifetime may occur if these two functions are combined in one transducer. For example, to obtain high modulation bandwidth, it is necessary to drive the laser with high current which reduces the reliability and lifetime. However, it is also well known in the art that compromises in transmitter cost, size and weight may occur if these two functions are separated. The cost of this indirect modulation configuration is high because there are more packaged parts and the connection between these parts requires optical packaging. In particular, a fiber coupling is required between the laser output and the input of its pigtail fiber, between the output of the laser's pigtail fiber and the input to the modulator's input pigtail fiber, between the output of the modulator and the input of its output pigtail fiber, and finally, between the output of the modulator's output pigtail fiber and the input to the fiber link. While the fiber-to-fiber coupling is relatively inexpensive, the couplings between the laser and its pigtail and the modulator and its pigtails are very expensive. Consequently, fabrication of the modulator is very expensive.

Therefore, to obtain desirable link performance, reliability, and lifetime for some applications, it is necessary to reduce the transmitter cost, size and weight by increasing the level of integration by combining several distinct functions into a single element. In particular, reducing the number of fiber couplings and the number of components required to receive and transmit light signals reduces the cost of fabrication. Chip layout space can also be reduced. Combining the receiver and transmitter into one element is a desirable approach. Combining the receiver and laser into one element has been difficult in the art, because the receiver and the laser have conflicting design constraints and requirements.

Also a desirable feature of the modulator is feedback stabilization. In the art, a tap off means is used to tap a small fraction of the light signal traveling through the waveguide or fiber. This tapped-off signal is sent to a circuit for feedback stabilization. Feedback stabilization usually requires one optical fiber and two fiber couplers for the transmittal of the tapped-off signal to the feedback circuit. Such tap-off means requires costly fiber coupling and much chip layout space. The tap-off technique also requires power from the light signal which reduces the available lightwave signal at the receiver, thus degrading the link signal-to-noise ratio.

SUMMARY OF THE INVENTION

The linear electrooptic effect is the preferred physical mechanism to affect lightwave modulation at microwave/millimeter-wave frequencies, or in systems requiring insensitivity to operating temperature and wavelength. However, waveguide modulators based on nonabsorptive mechanisms such as the electrooptic effect are unable to detect lightwave signals. It is very desirable to incorporate a means for photodetection in a waveguide modulator structure so both transmit and receive functions can be realized by a single bidirectional element. This reduces the layout area throughout the system (particularly at the transmit/receive circuits), simplifies the electrical/optical interface circuitry, and minimizes the number of chip-to-waveguide (including fiber) coupling ports which are typically lossy and difficult to implement.

Waveguide modulators and switches can generally be characterized in terms of a voltage-length product, and for semiconductor materials, a static depletion voltage. Nonuniformities or nonreproducibilities in the growth and fabrication of the epilayers comprising these devices cause changes in the device light-voltage transfer function (which is characterized in part by the voltage-length product and the depletion voltage). Furthermore, minuscule phase variations along the length of some device geometries (e.g., directional coupler modulator), or the accumulated net phase difference in other device geometries (e.g., Mach-Zehnder interferometer) will affect the phase of the periodicity in the resulting device light-voltage characteristic and hence the optimum device bias point. It is very desirable to incorporate into these device structures a means to sense the device transfer function for purposes of self-test, bias stabilization, and optimization of modulation depth or switching ratio.

This invention consists of an optical waveguide device, a pair of photodetectors, and electronic circuitry. The optical waveguide device is fabricated from thin layers of semiconducting alloys consisting of aluminum arsenide (AlAs) and gallium arsenide (GaAs) on a gallium arsenide substrate. This device preferably uses the linear electrooptic effect in device geometries that implement lightwave modulation or switching functions for operating wavelengths in the range 780–900 nm, but other device functions or physical mechanisms (e.g., carrier injection) may be used as is well known to those skilled in semiconductor guided-wave optics. The photodetectors consist of two Schottky contacts in a simple metal-semiconductor-metal (MSM) geometry, but may alternatively use a PIN device geometry as is well known to those skilled in photodetection technology. The electronic circuitry implements signal amplification from each of the photodetectors and may additionally implement various low-level functions such as thresholding, level shifting, and signal conditioning for driving the optical waveguide device, and various high-level functions such as self-test, bias setup and stabilization, and health-monitoring.

The lightwave modulation or switching functions realized using the linear electrooptic effect are generally based on selective phase retardation and its effects, such as modal interference. (For example, in a Mach-Zehnder interferometric modulator, an accumulated relative phase change is used to effect the selective excitation of either the fundamental (2 $\pi$m phase difference) or first order (2 $\pi$m+$\pi$ phase difference) lateral mode in an output waveguide that is then spatially filtered to transmit only the fundamental mode.) Since such effects are generally periodic with increasing drive voltage according to the relative phase difference, the throughput light power ranges from a relative "high" state to a relative "low" state according to the applied voltage. Practically speaking, the phase of this transfer function is unknown and must be determined empirically.

When the applied voltage is set for a "high" transmission state (also called the ON state), the input lightwave signal is minimally attenuated and is transmitted through the waveguide device to the output waveguides or fiber. On the other hand, in the "low" transmission state (also called the OFF state), modal interference or other similar phenomenon causes destructive interference or higher-order mode excitation that generates a radiation wave which is no longer confined to the waveguide core structure. In principle, this radiation wave belongs to the substrate radiation mode continuum and radiates into the substrate. (It is energetically unfavorable to radiate into the superstrate continuum because its bulk refractive index is small compared to the substrate continuum. This is easily understood on the basis of wave impedance which is inversely proportional to the bulk refractive index.) Since the substrate material is gallium arsenide in the geometry of this invention, this radiation wave is then absorbed in the gallium arsenide within an effective absorption depth via the generation of electron-hole pairs.

It is one object of this invention to place electrodes in close proximity to this optical absorption region to collect these electron-hole pairs to generate an electrical current in an adjacent electrical circuit. Back-to-back Schottky contacts forming a MSM photodetector can be used, but the choice of photodetector geometry is nonrestrictive. This photodetector is referred to below as the monitor photodetector if it is located on the output end of the optical waveguide device and as the receive photodetector if it is located on the input end of the optical waveguide device.

In the transmit mode of operation as the applied voltage is increased from zero to some maximum voltage, the periodic light-voltage transfer function will generate a periodic current from the monitor photodetector. In the modulator OFF state and ON state, the photodetector current will be a maximum and a minimum, respectively. Consequently, adjustment of the applied voltage to maximize or minimize the monitor current will ensure a minimum OFF or a maximum ON state, respectively, in the modulator.

Since optical waveguide devices are completely bidirectional, the ON state and OFF state operating characteristics are essentially identical for lightwave signals entering the device from the output end. In this receive mode of operation, the modulator is set in the OFF state to cause the input lightwave signal (entering the device output) to radiate into the receive photodetector after propagating along the modulator length. If the modulator is set in the ON state, the input lightwave signal will propagate through the device with minimal attenuation.

A simple cascade of these devices with integrated photodetectors can be used as a lightwave tap that has utility in certain optical network functions. Each tap implements the physical electrical/optical interface in an optical node on a network.

The strength of the coupling at each tap in such an implementation is adjustable from full ON to full OFF, permitting a very low amount of coupled and detected lightwave power to all the available lightwave power. Variable coupling strength permits each network node to receive precisely the same amount of lightwave power. Further, as this invention is fully bidirectional, it is possible and sometimes useful to determine the direction of light propagation in the network, since the receive photodetector will detect a signal if the incoming light enters the output waveguide of the device and the transmit photodetector will detect a signal if the incoming light enters the input waveguide of the device.

This invention is relatively easy to implement and does not require special material growth or fabrication procedures. The resulting simplicity in design, growth, and fabrication translates into lower potential cost and greater potential utility to the user.

This invention makes use of the fact that the underlying gallium arsenide substrate material has a high refractive index and is highly absorptive in the useful wavelength range from 780 nm to 900 nm. This is normally a problem in semiconductor guided-wave optics where low propagation loss is highly valued.

This invention uses the photons that are dumped into the substrate for the purpose of photodetection. For example, in the device OFF state, the radiated photons are detected and generate a useful current. This current may be ignored or used in device setup, continuous device health monitoring, and so forth.

If the ON state insertion loss is sufficiently low, these bidirectional optical elements can implement the physical interface at an optical node in a tapped optical bus.

The present invention is an optical element having three waveguides. The optical element has two waveguides that exist at opposite ends of the optical element. The end waveguides are connected to the input and output coupling ports of the optical element and the middle waveguide is the modulator.

The end waveguides are constructed in such a way to permit low-loss propagation of only a single spatial mode, called the fundamental mode, at the design lightwave frequency. Higher order spatial modes are not confined to the waveguide and experience high loss if they are somehow generated in the vicinity of the waveguides. The design conditions for waveguides having this characteristic are well known to those skilled in the art of guided-wave optics. The third waveguide exists between the other two waveguides in the middle of the optical element and is the modulator or the switch in the optical element. It may have any number of modes, depending on its design. One implementation has numerous lateral modes but only one vertical or depth mode. The physical mechanism giving rise to modulation is the interference among the lateral modes induced by an applied voltage on an electrode situated on top of the modulator. As the interference pattern at the input to the output waveguide deviates from closely approximating the mode distribution of the fundamental mode of the output waveguide, a portion of the interfering light is radiated from the interface between the middle and output waveguides.

Another desirable implementation is the Mach-Zehnder interferometer which consists of a single mode input waveguide, a splitting component, a pair of single mode waveguides, a combining component, and a single mode output waveguide. This is well known to those skilled in the art of guided-wave optics. The physical mechanism giving rise to modulation is the interference between the fundamental modes in each arm of the Mach-Zehnder interferometer. For a 2 πm net phase difference, the modes in each arm are in phase and the device excites the fundamental mode in the output single-moded waveguide. For 2 πm+π phase difference, the modes in each arm are out of phase and cannot excite the fundamental mode in the output waveguide. Instead, they excite the next highest order mode of opposite symmetry. Since the output waveguide is constructed to be single-moded, this next highest order mode is not a guided-mode of the waveguide but rather a radiation mode. It therefor radiates from the output waveguide.

Light signals travel through the optical element. One port is used for input signals and the other port is used for output signals. However, either port can be used as an input or an output. The optical element can function bidirectionally.

The optical element is situated on a substrate made of GaAs material. GaAs material absorbs light in the wavelength range from 780 nm to 900 nm that radiates out of the modulator during the operation of the optical element. In the operation of the modulator, destructive interference occurs in which the light signal radiates out of the modulator and becomes light that can be used. Usually, this light is lost and wasted. However, the GaAs substrate material that is used in the present invention absorbs this "lost" light. A detecting means is utilized to make use of the "lost" light.

Photodetector electrodes are used as the detecting means. The photodetector electrodes are placed on the GaAs substrate close to where the light radiates out of the modulator.

For a simple bidirectional communications link, the unmodulated light enters the input waveguide, is modulated in the modulator via an applied electric signal, and travels through the output waveguide. For the purpose of monitoring the quality of modulation, the monitor photodetector is used as described above. Very little light appears at the receive photodetector if no light enters the output waveguide from its output end. If light enters the output waveguide at its output end, it can be received at the receive photodetector. In this case, very little light enters the monitor photodetector if no light enters the input waveguide at its input end.

Other advantages of the present invention are apparent in the following description.

DESCRIPTION OF THE EMBODIMENT

Figure 1:
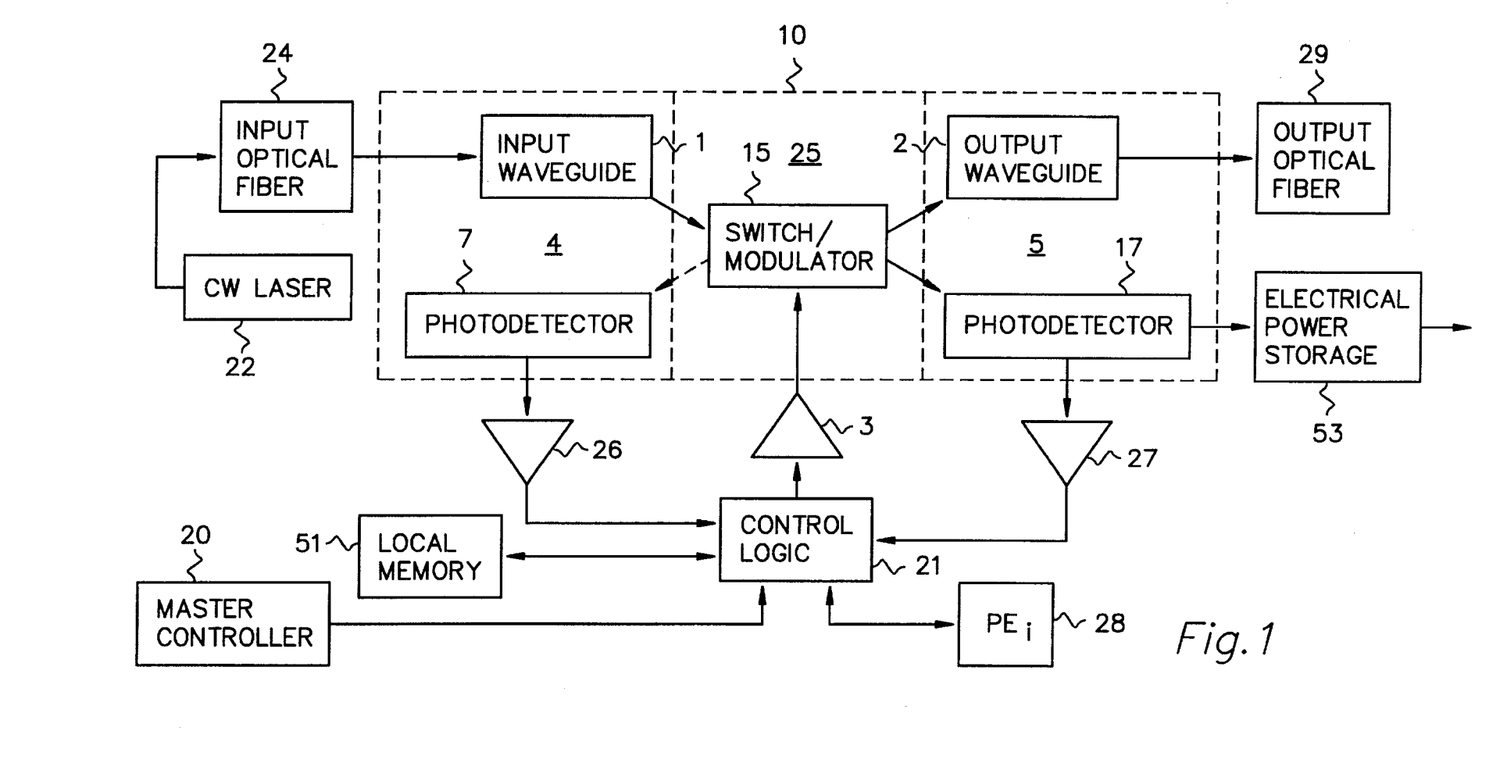
FIG. 1 is a block diagram of the optical element.

FIG. 1 is a block diagram of an optical element 10 that receives and transmits light signals. Optical element 10 is divided into three regions: two detection regions 4 and 5 and a switching region 25. Switching region 25 consists of a modulator waveguide 15 which is the switch of optical element 10 in which light signals travel through modulator 15 in an "on" state and radiate out of the modulator 15 in an "off" state. A master controller 20 and voltage source (driver) 3, via control logic 21, are used to control the switching function of optical element 10. Local memory 51 provides data and functionality storage for control logic 21. Detection regions 4 and 5 consist of photodetector electrodes 7 and 17 and waveguides 1 and 2. Photodetector electrodes 7 and 17 detect light when modulator 15 is in an "off" state. Waveguides 1 and 2 are input and output ports for the optical element 10. A continuous wave (CW) laser 22 outputs light through input optical fiber 24 to input waveguide 1. Data may be received from switch/modulator 15 at photodetector 7 which outputs information to control logic 21 via preamplifier 26, which constitute a data receive path. Information is passed from switch/modulator 15 to photodetector 17 which in turn goes through preamplifier 27 on to control logic 21. Such information passage constitutes a leveling and monitoring detection control path. Logical control input from master controller 20 goes to control logic 21. Information is sent to and/or received from processing element 28 ($PE_i$). The output of element 10 comes from output waveguide 2 on through output optical fiber 29.

Figure 6:
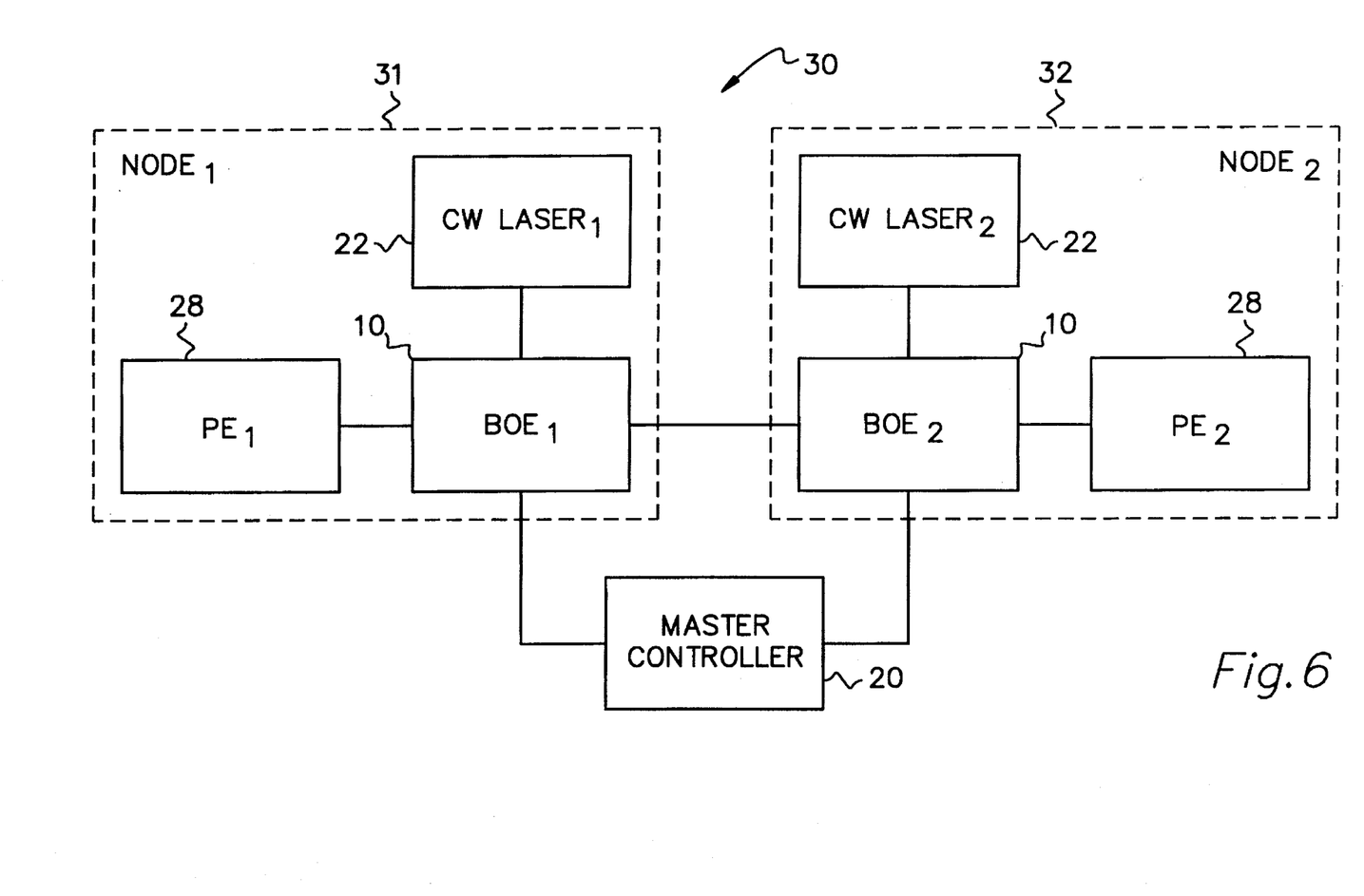
FIG. 6 shows a simple link incorporating two nodes.

Optical element 10 may be used in a simple bidirectional optical link 30 between two processing nodes, for example $Node_1$ 31 and $Node_2$ 32 as illustrated in FIG. 6. For simplicity, processing $Node_1$ 31 consists of processing element $PE_1$ 28, bidirectional optical element $BOE_1$ 10, and CW $Laser_1$ 22. Similarly, processing $Node_2$ 32 consists of processing element $PE_2$ 28, bidirectional optical element $BOE_2$ 10, and CW $laser_2$ 22. The input optical fiber 24, output optical fiber 29, preamplifiers 26 and 27 or drivers 26 and 27, and control logic 21, shown in FIG. 1, are implicit in the illustration for $Node_1$ 31 and $Node_2$ 32, although not shown in detail, in FIG. 6. The bidirectionality characteristic of optical element 10 permits $BOE_1$ to transmit information from $PE_1$ to $BOE_2$ which receives the information and conveys it to $PE_2$; and conversely, $BOE_2$ can transmit information from $PE_2$ to $BOE_1$ which receives the information and conveys it to $PE_1$. Master controller 20 designates when $BOE_1$ is transmitting and $BOE_2$ is receiving, and conversely. For a simple bidirectional optical link 30, $BOE_1$ and $BOE_2$ are configured to transmit or receive, but not both simultaneously.

Figure 5:
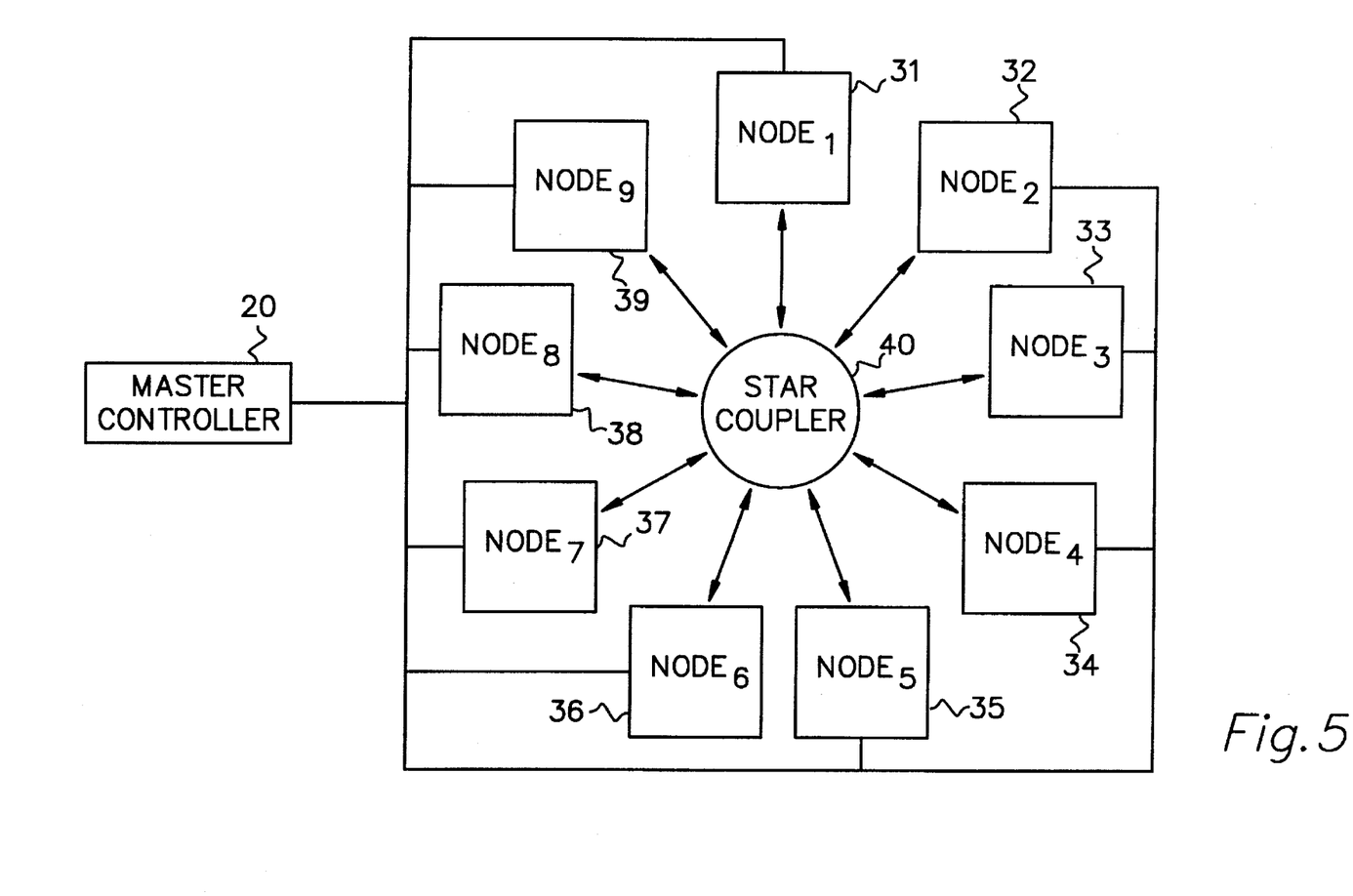
FIG. 5 is a diagram of a network of nodes having processing elements and optical elements in connection with a star coupler.

A more sophisticated application of optical element 10 is illustrated in FIG. 5, having nodes 31–39. In FIG. 5, each $Node_i$, for i=1, 2, ..., m, where m=9 in FIG. 5, is physically connected by optical fiber to a star coupler 40, which allows it to communicate to all m nodes. The function of star coupler 40 is to distribute the lightwave signal from any and all inputs to all outputs. In particular, a transmitted lightwave signal from $Node_3$ 33 enters star coupler 40 and is broadcast to all m nodes 31, 32, 34, 35, 36, 37, 38 and 39, including $Node_3$ 33. Master controller 20 designates when each node can transmit and all other nodes must receive.

Figure 2:
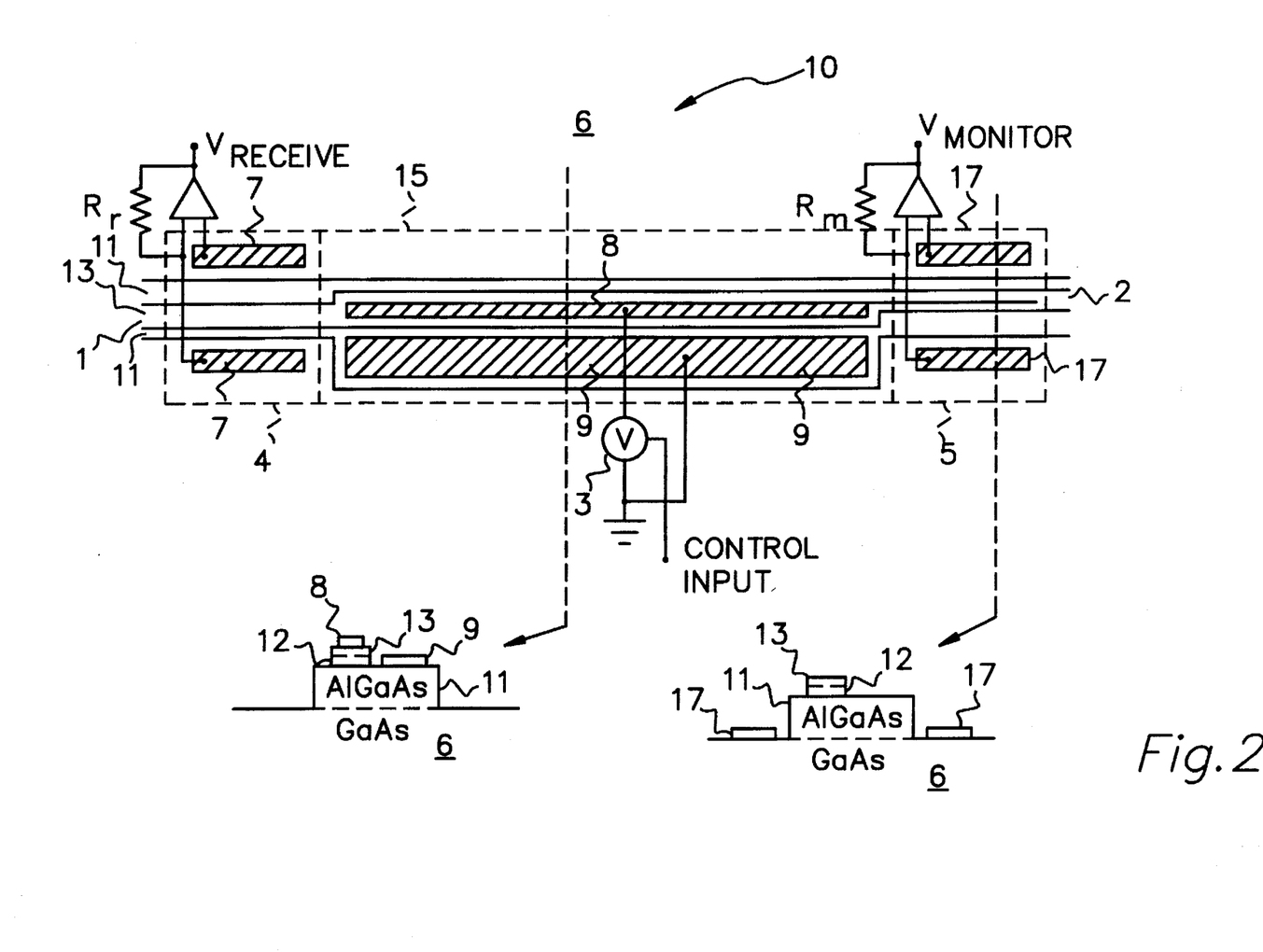
FIG. 2 is a top view of the optical element.
Figure 3:
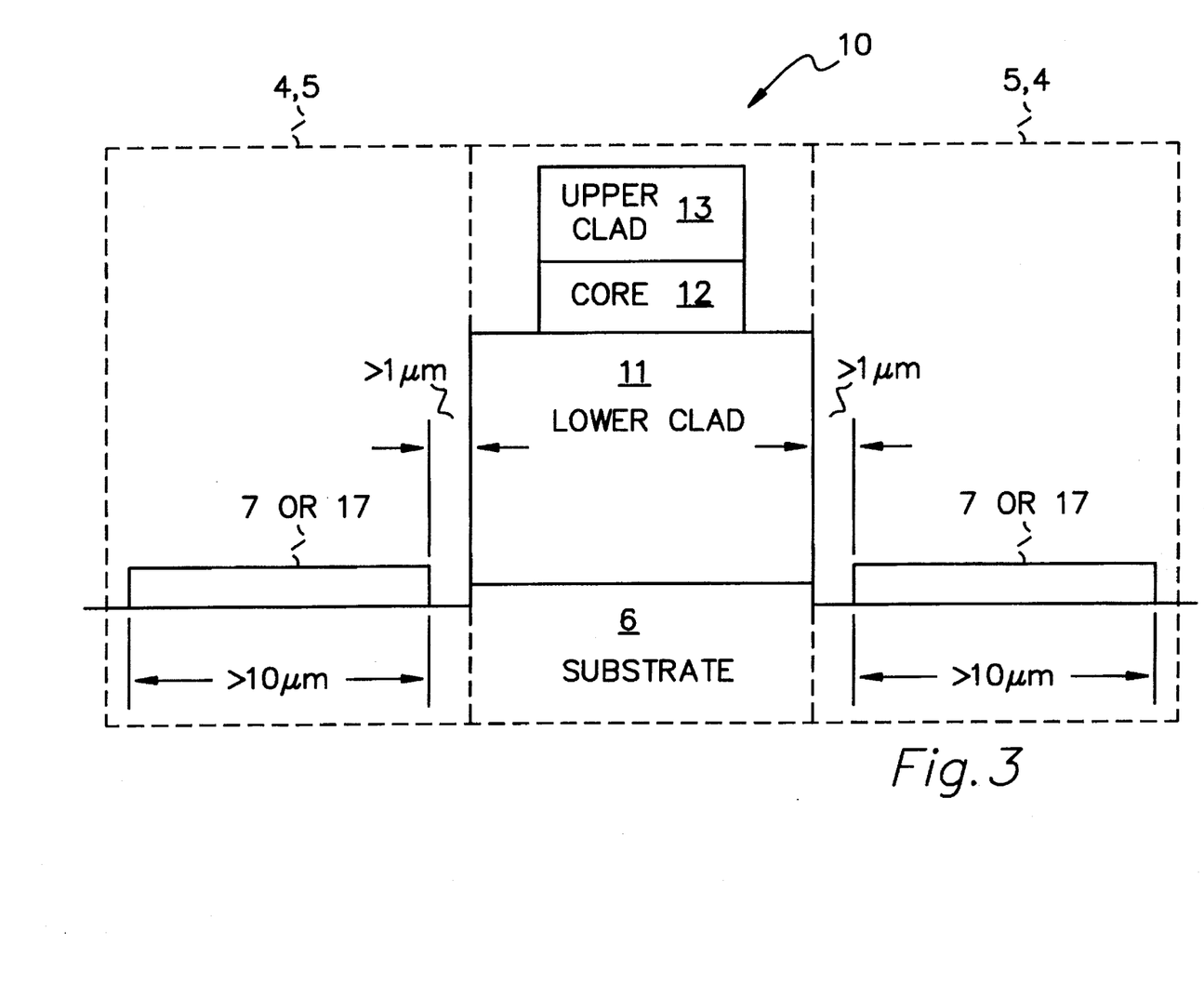
FIG. 3 is a frontal view of the detection region of the optical element.
Figure 4:
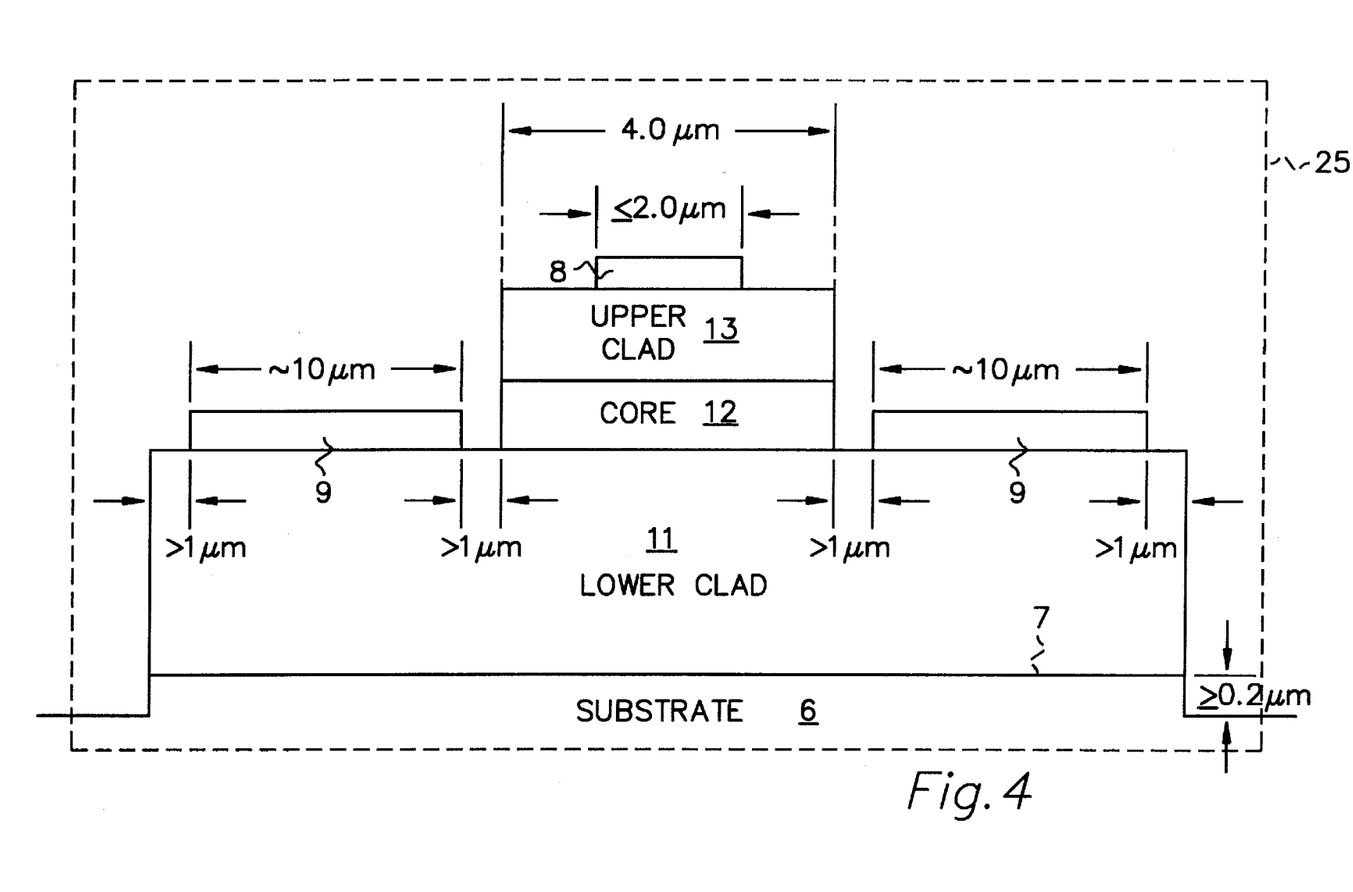
FIG. 4 is a frontal view of the cross section of the optical element exposing the signal modulation region.
Figure 7A:
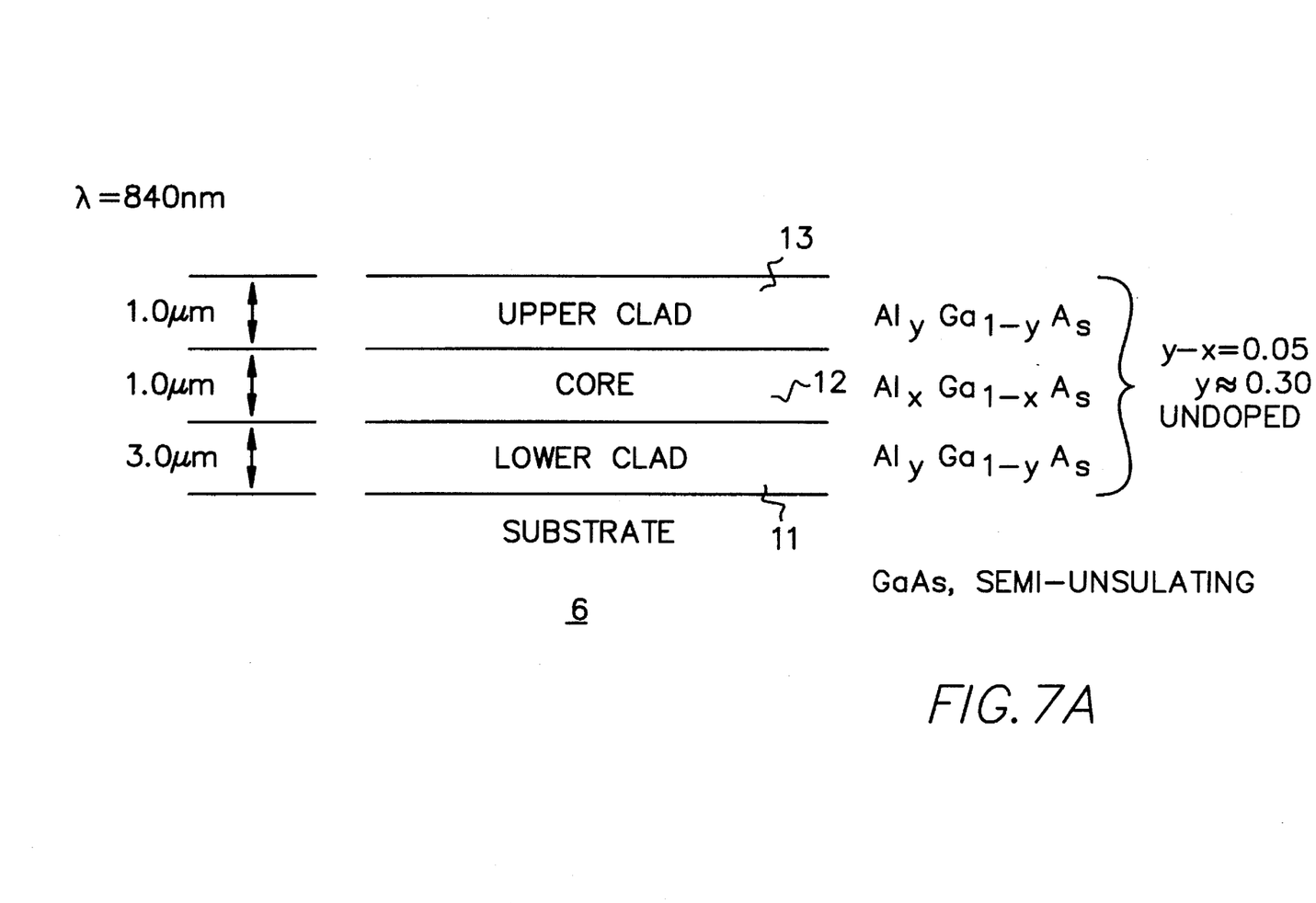
FIG. 7a and 7b illustrate an optical waveguide layer design.
Figure 7B:
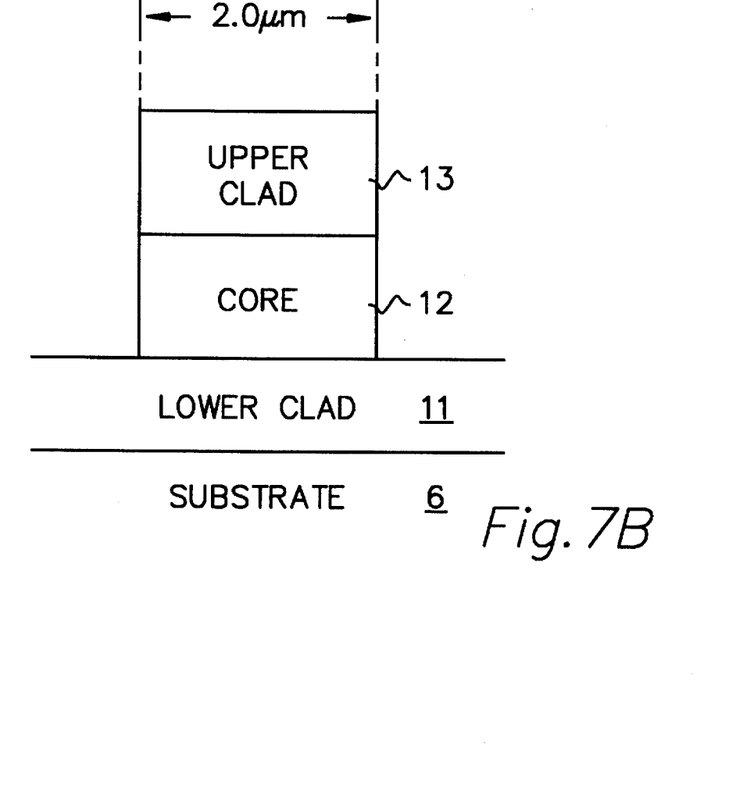

FIG. 2 is a top view, not a cross-section, of optical element 10. Optical element 10 consists of three waveguides: input waveguide 1; modulator waveguide 15; and output waveguide 2. Input and output waveguides 1 and 2 are ports for optical element 10 and are referred to as input port 1 and output port 2, respectively, but could be output port 1 and input port 2. Modulator waveguide 15 is referred to as just a modulator. The waveguides used in optical element 10 are one port to one port waveguides fabricated from AlGaAs material. The waveguides consist of three levels: upper clad 13, core 12, and lower clad 11 as shown in FIGS. 3 and 4. Upper clad 13 and lower clad 11 are shown in FIG. 2, but core 12 is not apparent because it is under upper clad 13. FIG. 7a shows a waveguide epilayer design for a wavelength of 840 nm having a GaAs semi-insulating substrate 6 with a 3.0 μm lower clad 11 of undoped $Al_yGa_{1-y}As$ on substrate 6. A 1.0 μm thick core 12 of undoped $Al_xGa_{1-x}As$ is on lower clad 11. On core 12 is a 1.0 μm thick upper clad 13 of undoped $Al_yGa_{1-y}As$. In the compositions, y−x=0.05 and y≈0.30. FIG. 7b shows an end view of the input and output waveguides having core 12 and upper clad 13 with a width of 2.0 μm. Lower clad 11 and substrate 6 are of a substantially greater width than upper clad 13 and core 12.

The materials constituting the lower clad 11, the core 12, and the upper clad 13 are undoped in the above exemplary description. This is a preferred embodiment for high-frequency applications. As is well known to those knowledgeable in the design of semiconductor waveguides, any of these layers may be doped p-type or n-type to achieve certain device characteristics, particularly higher electrooptic efficiency. For example, by p-doping the upper clad and n-doping the lower clad, and by applying a reverse-bias to the resulting p-i-n device, the electrooptic device efficiency can be improved about order of magnitude since the applied electric field is largely confined to the core between the p-doped upper clad and the n-doped lower clad. The interaction efficiency between the applied electric field and the optical field is high because this is the region occupied by the optical field. The disadvantages of doping the layers is that the optical loss is increased, the electrical loss is increased, and the high-frequency electromagnetic mode on the electrode transmission line is slowed down significantly.

Figure 8A:
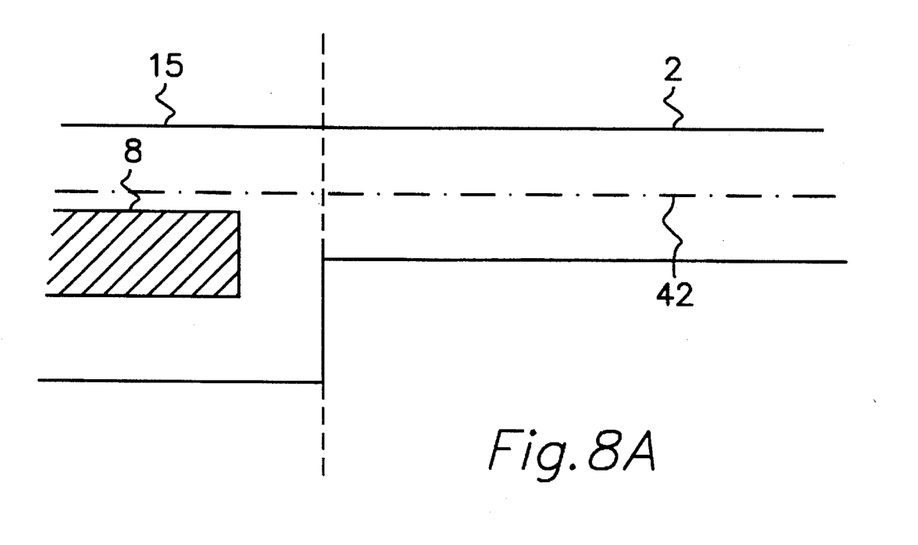
FIGS. 8a and 8b show the junction between the modulator and the output waveguide.
Figure 8B:
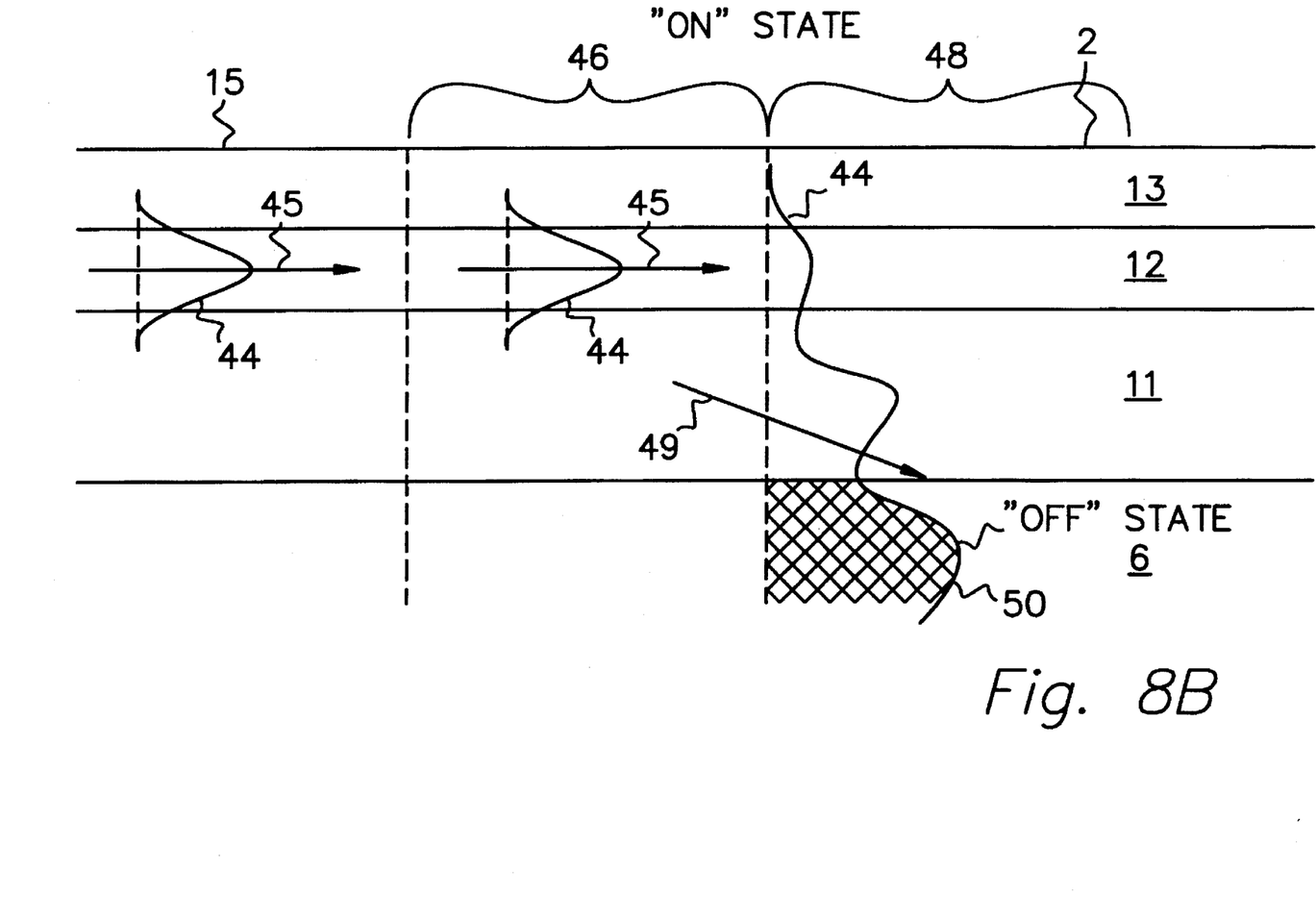

Modulator 15 allows optical element 10 to function as an on/off switch, as illustrated in FIGS. 8a and 8b. FIG. 8a is a top view of a junction between switch/modulator 15 and output waveguide 2 having optical axis 42. FIG. 8b shows a side view of the junction in a vertical plane containing optical axis 42. FIGS. 8a and 8b are aligned with each other. Light distribution curve 44 shows the direction and distribution of and represents the light in modulator 15 prior to reaching the "on" state 46 of which light 44 continues in direction 45. If light 44 reaches an "off" state 48, the light shifts to a direction 49 towards substrate 6 and is absorbed by substrate 6, as is shown by cross-hatch portion 50 which is a culmination of "off" state 48. In summary, modulator 15 exists in one of two states: "off" state 48 and "on" state 46. In "on" state 46, a light signal 44 travels through optical element 10. In "off" state 48, light signal 44 will not pass through optical element 10. Master controller 20 decides which state modulator 15 will be in. Master controller 20 sends a logic signal to voltage source 3 indicating which state modulator 15 should be in. Master controller 20 is a basic logic element, such as a microprocessor, that is well known in the current field of technology. Master controller 20 does not exist on substrate 6 of optical element 10 itself, but nearby.

Voltage control source 3 applies a voltage, in accordance with the state that master controller 20 indicates, to modulator 15 that will realize the state it is to exist in. When modulator 15 should be in "on" state 46, a voltage is applied to achieve the "on" state and light signal 44 travels through the element 10. When modulator 15 should be in "off" state 48, another voltage is applied to achieve the "off" state to a signal electrode 8 that exists on upper clad 13 of modulator 15, of FIG. 4, in which an electrooptic effect is created that causes destructive interference so that light signal 44 radiates out of modulator 15 into substrate 6 as absorbed light 50, in FIG. 9b. Ground electrodes 9 are situated on a lower clad 11 of modulator 15. Electrodes 9 ground modulator 15.

Figures 9A, 9B:
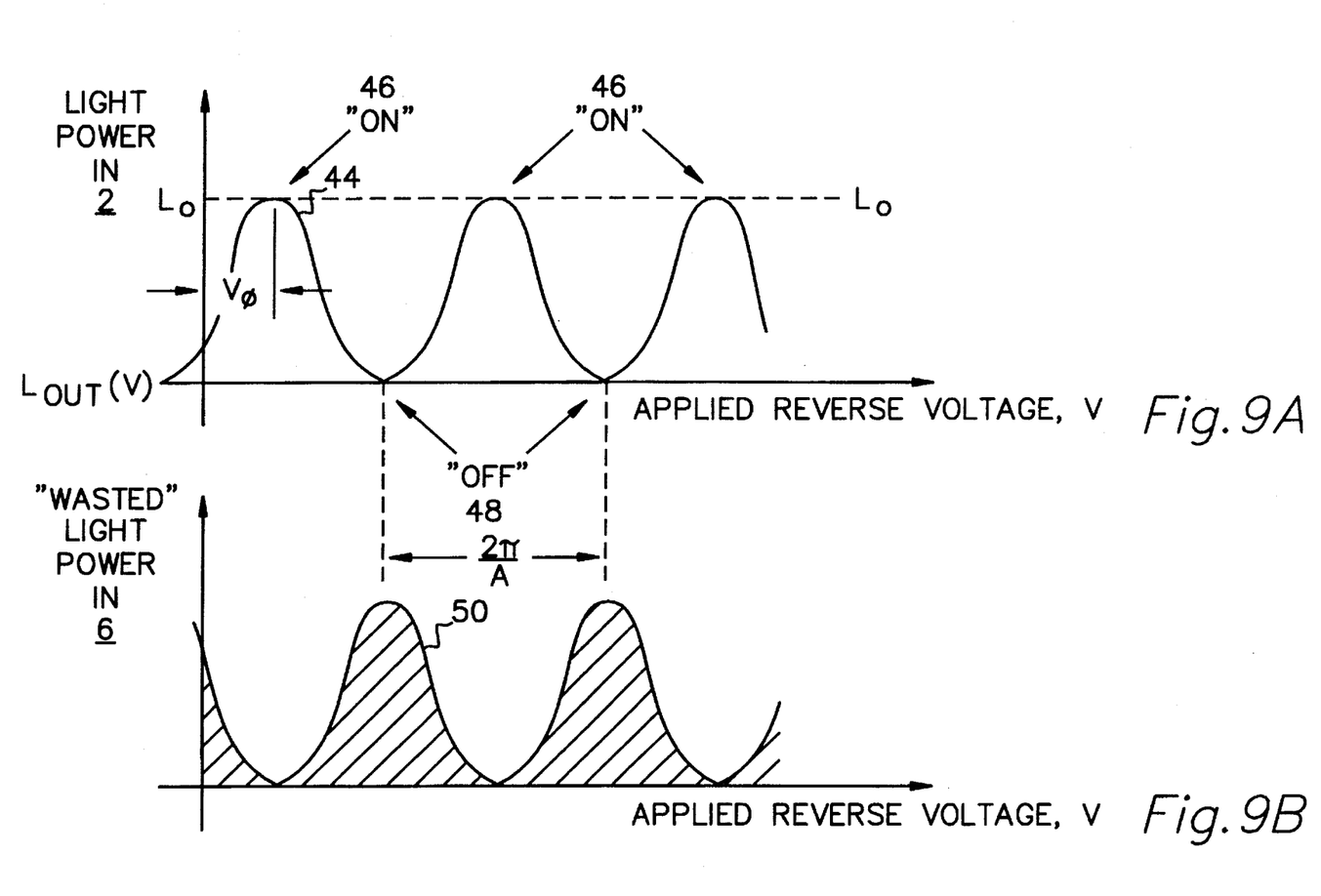
FIG. 9a reveals the relationship between light power in the output waveguide and the reverse voltage applied to the modulator.
FIG. 9b reveals the relationship between wasted power in the substrate and the reverse voltage applied to the modulator.

Light signal 44 is generally a sinusoidal signal. Light signal 44 depicted in a graph of FIG. 9a consists of the x-axis representing the (reverse) voltage applied to modulator 15 and the y-axis representing the light (power) which propagates along output waveguide 2 when input waveguide 1 transmits light to modulator 15. The voltage to be applied to modulator 15 to create the electrooptic effect, referred to as the applied voltage hereafter, is determined by looking at the amplitude of the light signal 44 after at least one period. It is well known in this area of technology the method of determining the voltage to create the desired electrooptic effect. An example of a mathematical description for a representative light-voltage transfer function is given by the following equation:

$$L_{OUT}=(L_O/2)\cos(A(V-V_\phi))+(L_O/2)$$

where:

$L_{OUT}$ is the amplitude of the light signal;

$L_O$ is the amplitude of the light signal at its peak;

A is a constant dependent on the modulator geometry;

V is the magnitude of the applied reverse bias voltage; and $V_\phi$ is the offset voltage required for V to set $L_{OUT}$ equal to $L_O$.

The period, $2\pi/A$, of the light-voltage transfer function is always known for a fixed modulator geometry, but the offset voltage, $V_\phi$, of the light-voltage transfer function can change from device to device. It is important to know $V_\phi$ as accurately as possible to obtain the highest possible modulator and switch performance. Since $V_\phi$ is not generally repeatable from device to device, the light-voltage transfer function must be measured for each device. This is accomplished by measuring $L_{OUT}$ while V is varied from zero to approximately $2(2\pi/A)$. For convenience, we can refer to the measured light-voltage transfer function as $L_{OUT}(V)$ which implicitly contains $L_O$, A, V, and $V_\phi$. $L_{OUT}(V)$ is contained in the memory implicitly assumed for and required by control logic 21. All of the specific characteristics of the light-voltage transfer function of modulator 15 are incorporated in control logic 21 such that when master controller 20 commands the optical element 10 to be in a particular state, it does so by sending the appropriate logical control input signals to control logic 21. Control logic 21 interprets these control signals and sets the state of modulator 15 by determining the appropriate voltage signals to apply to voltage source (driver) 3 on the basis of the measured $L_{OUT}(V)$ specific to modulator 15.

As previously mentioned, voltage controlled voltage source 3 causes modulator 15 to act as a switch. The voltage applied by voltage controlled voltage source 3 changes the state of modulator 15 based on the amount of applied voltage which is determined from the above equation. Voltage controlled voltage source 3 is not located on optical element 10 itself, but elsewhere on the substrate. Voltage controlled voltage source 3 is well known by those skilled in this field of technology.

In optical element 10, one port, 1 or 2, acts as an input port and the other port, 2 or 1, acts as an output port, respectively. Light signals travel through optical element 10 by entering at one port, 1 or 2, and exiting at the other port, 2 or 1. In sum, a feature of optical element 10 is that either port can act as the input port or the output port. The bidirectionality aspect of optical element 10 is that it can act as a receiver or a transmitter of light signals at either port. Optical element 10 can only operate as a receiver or transmitter at one time; however, it can operate as a receiver at each port at the same time, allowing optical element 10 to listen for signals at either port 1 or 2.

The bidirectionality aspect does not affect the switching operation of optical element 10. As noted above, and in FIGS. 9a and 9b, modulator 15 operates in two states. "On" state 46 allows light signal 44 to travel straight through modulator 15. In "off" state 48, an electrooptic effect is created in which destructive interference occurs and light signal 44 radiates out of modulator 15. Light signal 44 does not radiate out of modulator 15 until after traveling the length of modulator 15. The switching function is controlled by a given voltage applied by voltage controlled voltage source 3 to modulator 15. In "on" state 46, with the appropriate bias voltage, no additional signal voltage is applied. In "off" state 48, a sufficient signal voltage is applied to increase the electrooptic effect to reduce the light signal remaining in the output waveguide. The amount or application of the applied reverse voltage is not dependent on direction of the light so the bidirectionality aspect of optical element 10 is symmetric as to the operation of modulator 15.

If a light signal travels from the left end of optical element 4 and modulator 15 is in an "on" state 46, the light signal would just travel through optical element 10 and exit at the right end of optical element 5. If modulator 15 is in an "off" state 48, the light signal would enter modulator 15 and the increased electrooptic effect would cause higher order mode excitation in which the light signal would radiate out of modulator 15 at the right end of optical element 5. In this example, left end 4 of the optical element 10 is the input port and right end 5 of optical element 10 is the output port.

In the previous example, left end 4 acted as the input port and right end 5 acted as the output port. On the other hand, if a light signal comes from right end 5, right end 5 would act as the input port and left end 4 would act as the output port. If modulator 15 is in an "on" state 46, the light signal would pass through modulator 15 and exit at the left end 4 of optical element 10. If modulator 15 is in an "off" state 48, the light signal would radiate out of modulator 15 at left end 4 of optical element 10. In summary, either port can act as an input or output port.

The bidirectionality feature also permits optical element 10 to function as a receiver or a transmitter of light signals. In the related art, two separate components were required to transmit and receive signals. As mentioned in the background of the invention, much expense and chip layout space are required for receivers and transmitters. The receivers and transmitters themselves are expensive and require much chip layout space as well as significant fiber coupling needed to connect the waveguides to the receiver and transmitter. Now that one component is used instead of two for receiving and transmitting light signals, less chip layout space is used and the cost for materials and manufacturing is reduced.

Light signal 44 radiates out of modulator 15 when the modulator is in "off" state 48. Light signal 44 exits modulator 15 at the end of optical element 10 opposite the end the light signal entered. Of course, this end is referred to as the output port of optical element 10. When light signal 44 radiates out of modulator 15, it becomes light that can be used for conversion into electrical signals. Typically, the light from the light signal is unused and wasted. The present invention places optical element 10 on a GaAs substrate 6 and uses the GaAs material to absorb this "lost" light 50. FIG. 9b shows the "wasted" or absorbed power 50 in substrate 6 as a sinusoidal function, versus (reverse) voltage. The sum of the functions in FIGS. 9a and 9b is equal to a constant. When the light exits modulator 15, GaAs substrate 6 absorbs light 44 and electron-hole pairs are created. Photodetector electrodes 7 collect the electron-hole pairs to create current used for other uses such as feedback stabilization or circuit monitoring. The current may be stored in electrical power storage device 53 which in turn can provide power to the optical element electronics. Storage device 53 may consist of chargeable battery cells and/or capacitors for electrical power storage. Also, device 53 may contain voltage and/or current regulating electronics.

GaAs circuitry is commonly used in optical modulators, but has not been used in the way the present invention incorporates it. In the related art, GaAs circuitry was used to modulate an optical signal being transferred through a circuit by using the electrooptic effect which would allow the material to cause modulation of the light itself. The light would radiate out of the waveguide, but that light was lost and wasted. The present invention uses the GaAs material as an absorbing element to save the light for generating a current useful for a variety of purposes. However, the GaAs material typically absorbs light that has a wavelength of 865 nm or less.

Electrode photodetectors 7 and 17 are placed at the point where the light signal exits modulator 15 so that they can detect the "lost" light. The light exits modulator 15 at the output port end of optical element 10. Photodetectors 7 and 17 are made of two Schottky contacts formed in a metal-semiconductor-metal (MSM) geometry or a PIN geometry which is well known in the present field of technology. Electrodes of photodetector 7 or 17 collect electron-hole pairs from GaAs substrate 6 and the electron-hole pairs result in an electrical current in the electrodes. Therefore, "lost" light 50 (cross-hatch of FIG. 8b) is utilized instead of being lost to waste. This lost light can be used for, for instance, feedback stabilization and thus no extra energy source is required except that required to drive preamplifiers 26 and 27 which condition the electric signal for control logic 21. This saves chip layout space and expense.

Since either end of optical element 10 can act as the output port, a pair of photodetector electrodes, 7 and 17, is placed at each of both ends of optical element 10. The pairs of electrode photodetectors 7 and 17 exist at the ends of optical element 10 so that electron-hole pairs are collected no matter which end of optical element 10 is the output port. One electrode 7 or 17 is on one side of the port and the other electrode 7 or 17, respectively, is on the other side of the port. The current derived from the discarded light signal may be used to power any of many possible functions in the optical modulator system.

As mentioned above, the conversion of the "lost" light to electrical energy is highly beneficial. In the related art, another means for tapping the lightwave signal is required to perform certain functions such as feedback stabilization. Supplying this lightwave signal tap requires many extra components and does not utilize the "wasted" lightwave signal. The cost of parts for a lightwave signal tap is high. Manufacturing costs are high as well. With the present invention, such lightwave taps are not needed. Costs of parts are lower and power usage is much more efficient.

FIG. 3 is a frontal view of detection region 4 and 5 of optical element 10 looking at optical element 10 from one of the ends of the optical element 10. The waveguides used in optical element 10 consist of three layers which are upper clad 13, core 12, and lower clad 11. The light signal travels primarily in core 12. Upper clad 13 and lower clad 11 keep the light signal in core 12 so as to keep the light signals traveling through the waveguide instead of radiating out of the waveguide. The theory of how waveguides function is well known in the art.

The following description gives a preferred embodiment for optical element 10 using a modulator design based on two-mode interference. The dimensions are appropriate for preferred aluminum arsenide compositions for upper clad 13, lower clad 11, and core 12, and the operating wavelength. For the two-mode interference modulator design, significant flexibility is possible in the dimensions and the aluminum arsenide compositions of the clad and the core, as is well known to those skilled in the art of designing optical waveguides. For example, if the aluminum arsenide composition difference between the clad and the core is decreased, the dimensions can be increased, and conversely. For alternative modulator designs, such as the Mach-Zehnder interferometer, a preferred embodiment will be slightly more complicated, although the underlying input and output optical waveguide design can be exactly the same as in the two-mode interference modulator. Nevertheless, both the Mach-Zehnder interferometer and the two-mode interference modulator exhibit and share the following essential features: single mode input and output waveguides, mode interference resulting in a "on" state having small throughput loss, and mode interference resulting in an "off" state with radiation mode generation and having a large throughput loss.

Upper clad 13 and core 12 are both 2 um wide and 1 um thick. Upper clad 13 is situated on top of core 12 and core 12 is situated on top of lower clad 11. Upper clad 13 and core 12 are located in the middle of lower clad 11 at about 13 um away from the edges of lower clad 11. The thickness of lower clad 11 is 3 um and the width is 28 um. Lower clad 11 sits directly on substrate 6 which is extended 0.2 um above the rest of the level of substrate 6. Upper clad 13 and lower clad 11 are composed of $Al_{0.3}Ga_{0.7}As$ and core 12 is composed of $Al_{0.25}Ga_{0.75}As$.

Photodetector electrodes 7 and 17 are located about 1 um from lower clad 11 of optical element 10 and directly on top of substrate 6. Photodetector electrodes 7 and 17 are made of approximately 100 angstroms of Ti and 5000 angstroms of Au. The dimensions of the photodetector electrodes 7 and 17 are approximately 10 um wide and approximately 0.5 um thick.

FIG. 4 is a cross section of optical element 10 in the area of switching region 25. Upper clad 13, core 12 and lower clad 11 are the same as shown in FIG. 3, but the dimensions of the three layers are different. Upper clad 13 and core 12 are each 4 um wide and 1 um thick. Lower clad 11 is 28 um wide and 3 um thick. Upper clad 13 and core 12 are located in the middle of lower clad 11 and have edges about 12 um away from the edges of lower clad 11.

Three electrodes exist on waveguide 15. One electrode is a signal electrode 8 and the other two electrodes are ground electrodes 9. These electrodes are made of the same material as the electrodes shown in FIG. 3. Signal electrode 8 is 2 um wide and 0.5 um thick. Signal electrode 8 is situated on top of the upper clad 13 in the middle and about 1 um from the edges of the upper clad 13. Signal electrode 8 is the electrode that receives a voltage from voltage controlled voltage source 3 for determining whether the modulator 15 will be in an "off" state or an "on" state. Ground electrodes 9 are each 10 um wide and 0.5 um thick. Ground electrodes 9 are on lower clad 11. One electrode 9 is on one side of waveguide core 12 and the other electrode 9 is on the other side of waveguide core 12. Each of ground electrodes 9 is located approximately 1 um away from core 12. Ground electrodes 9 are used as a ground.

We claim:

1. A bidirectional optical modulating element having energy recapture of deflected light, comprising:

modulating means for conveying, modulating and deflecting light;

first waveguide means, connected to said modulating means, for conveying light to or from said modulating means;

second waveguide means, connected to said modulating means, for conveying light to or from said modulating means;

absorbing means, connected to said modulating means, for absorbing light deflected by said modulating means; and detection means, connected to said absorbing means, for recapturing and converting the absorbed light to an electrical current.

2. The bidirectional optical modulating element of claim 1 further comprising voltage source means, connected to said modulating means, for applying a voltage to said modulating means for modulating and deflecting light in accordance with a magnitude of the voltage.

3. The bidirectional optical modulating element of claim 2 further comprising controlling means, connected to said voltage source means, for sending a signal to said voltage source means to indicate a state of modulating and deflecting light.

4. The bidirectional optical modulating element of claim 3 further comprising a processing element, connected to said controlling means, for receiving from and/or transmitting information to said controlling means.

5. The bidirectional optical modulating element of claim 4 wherein said detection means is connected to said controlling means.

6. A plurality of bidirectional optical modulating elements wherein:

each bidirectional optical modulating element comprises:
   a modulator for modulating light;
   a first port, connected to said modulator, for conveying light to said modulator;
   a second port, connected to said modulator for conveying light from said modulator;
   an absorbing device, connected to said modulator, for absorbing light from said modulator and converting the absorbed light into electrical power;
   a light source, connected to said first port, for providing light;
   a voltage source, connected to said modulator, for providing a voltage to said modulator to implement a degree of modulation of light in accordance with the voltage;
   a control logic device, connected to said absorbing device and to said voltage source, for monitoring the electrical power from said absorbing device and for controlling a magnitude of the voltage provided by said voltage source to said modulator; and a processing element, connected to said control logic device, for processing information received from or sent to said control logic device; and said plurality of bidirectional optical modulating elements are interconnected with one another; and said plurality of bidirectional optical modulating elements are connected to a master controller, said master controller designating when each bidirectional optical modulating element can transmit information or receive information.

7. The plurality of bidirectional optical modulating elements of claim 6 further comprising a star coupler for effecting an interconnection among said plurality of bidirectional optical modulating elements.

8. A bidirectional optical modulator comprising:

a first waveguide, having first and second ends, for conveying light;

at least one electrode proximate to said waveguide;

an electrical signal source, connected to said at least one electrode, for providing an electrical signal to said at least one electrode, effecting an electrooptic effect deflecting light in said first waveguide, resulting in modulating of the light conveyed in said first waveguide;

second waveguide connected to the first end of said first waveguide, for conveying light to and from said first waveguide;

a third waveguide, connected to the second end of said first waveguide, for conveying light to and from said first waveguide;

a light absorber, proximate to said first, second and third waveguides, for absorbing light deflected from said first, second or third waveguide; and a first detector, proximate to said light absorber, in conjunction with said light absorber for converting the light deflected from said first, second or third waveguide, into electrical power.

9. The bidirectional optical modulator of claim 8 wherein the light deflected from said first, second or third waveguide, that is absorbed by said light absorber, results in electron-hole pairs which are collected by said first detector to output electrical power.

10. The bidirectional optical modulator of claim 9 wherein:

said light absorber is a substrate;

said first waveguide comprises:
 a lower clad formed on said substrate;
 a core formed on said lower clad;
 an upper clad formed on said core;
 a ground electrode, connected to said electrical signal source, formed on said lower clad; and
 a signal electrode, connected to said electrical signal source, formed on said upper clad;

said second waveguide comprises:
 a lower clad formed on said substrate;
 a core formed on said lower clad; and
 an upper clad formed on said core;

said third waveguide comprises:
 a lower clad formed on said substrate;
 a core formed on said lower clad; and
 an upper clad formed on said core; and said first detector comprising:
 a first electrode formed on said substrate; and
 a second electrode formed on said substrate.

11. The bidirectional optical modulator of claim 10 wherein:

said substrate comprises gallium arsenide;

said lower clad of said first, second and third waveguides, comprises aluminum gallium arsenide;

said core of said first, second and third waveguides, comprises aluminum gallium arsenide; and said upper clad of said first, second and third waveguides, comprises aluminum gallium arsenide.

12. The bidirectional optical modulator of claim 11 wherein:

said ground and signal electrodes of said first waveguide, each comprise a material containing gold and titanium; and said first and second electrodes of said first detector, each comprise material containing gold and titanium.

13. The bidirectional optical modulator of claim 8 further comprising:

a second detector, proximate to said light absorber; and an electrical power storage device connected to said first detector.

14. The bidirectional modulator of claim 13 further comprising:

a control logic device connected to said electrical signal source, and to said first and second detectors;

a master controller connected to said control logic device; and an information processor connected to said control logic device.

15. The bidirectional modulator of claim 14 further comprising:

a first optical fiber connected to said second waveguide;

a second optical fiber connected to said third waveguide; and a light source connected to said first optical fiber.

16. The bidirectional optical modulator of claim 15 wherein:

said first detector outputs leveling and monitoring control information to said control logic device;

said second detector outputs data received information to said control logic device;

said master controller outputs control information to said control logic device; and said information processor receives, processes and transmits useful information from and to said control logic device.

17. A bidirectional optical modulator comprising:

a substrate;

a first waveguide, having first and second ends, formed on said substrate;

a first electrode formed on said first waveguide;

a first detector having a second electrode formed on said substrate; and wherein:
 said first waveguide is for conveying a significant amount of light from the first end to the second end of said first waveguide;
 first said electrode is for applying an electrooptic effect to the light in said first waveguide upon application of a sufficient voltage on said first electrode, the electrooptic effect deflecting the light into said substrate, to be absorbed by said substrate, resulting in an insignificant amount of light exiting from the second end of said first waveguide, and an application of an insufficient voltage on said first electrode resulting in a significant amount of light exiting from the second end of said first waveguide; and the second electrode of said first detector collects current from said substrate caused by light absorbed in said substrate.

18. The bidirectional optical modulator of claim 17 wherein:

said substrate comprises gallium arsenide;

said first waveguide comprises aluminum gallium arsenide; and the light absorbed in said substrate causes electron-hole pairs which are collected by the second electrode of said first detector to result in an electrical current at the second electrode of said first detector.

19. The bidirectional optical modulator of claim 18 further comprising an electrical power storage device, connected to said first detector, for storing the electrical current at the electrode of said first detector.

20. The bidirectional optical modulator of claim 19 further comprising:

a voltage source connected to said electrode formed on said first waveguide;

a second waveguide connected to the first end of said first waveguide;

a third waveguide connected to the second end of said first waveguide; and a second detector having an electrode formed on said substrate.

21. The bidirectional optical modulator of claim 20 further comprising:

a light source connected to said second waveguide; and a control logic device connected to said voltage source, and to said first and second detectors.

22. The bidirectional optical modulator of claim 21 wherein an output of said electrical power storage device is connected to said voltage source and to said control logic device.

23. The bidirectional optical modulator of claim 22 further comprising:

a master controller connected to said control logic device; and an information processing element connected to said control logic device.

24. A bidirectional optical modulating element having energy recapture of deflected light, comprising:

modulating means for conveying, modulating and deflecting light;

absorbing means, connected to said modulating means, for absorbing light deflected by said modulating means; and detection means, connected to said absorbing means, for recapturing and converting the absorbed light to an electrical current.

25. The bidirectional optical modulating element of claim 24 further comprising a storage means, connected to said detection means, for storing the electrical current.

* * * * *